UNITED STATES PATENT OFFICE.

WILLIAM R. LOVEMAN, OF LAKEWOOD, OHIO, ASSIGNOR, BY MESNE ASSIGNMENTS, TO NATIONAL CARBON COMPANY, INC., A CORPORATION OF NEW YORK.

PROCESS OF PURIFYING ZIRCONIUM ORES.

1,297,371.     Specification of Letters Patent.     Patented Mar. 18, 1919.

No Drawing.     Application filed September 1, 1915. Serial No. 48,529.

*To all whom it may concern:*

Be it known that I, WILLIAM R. LOVEMAN, a citizen of the United States, residing at Lakewood, in the county of Cuyahoga and State of Ohio, have invented a certain new and useful Improvement in Processes of Purifying Zirconium Ores, (Docket 183,) of which the following is a full, clear, and exact description.

Zirconium oxid and other compounds of zirconium find extensive use in the various industries, such as the manufacturing of arc lamp electrodes and the enameling industry; but all of these require that the zirconium compound be in a substantially pure condition. This precludes the use of any natural zirconium product and the prior processes of purifying zirconium ores have been so unsatisfactory that there have been numerous attempts to improve on these to the extent where the purification of the ore could be carried out in a practical, commercial way. As far as I know, however, no one prior to my invention had discovered a successful way of doing this. The manner in which I accomplish the desired result will now be explained.

The impure zirconium oxid containing silica, titanium, iron and aluminum, is treated with an excess of concentrated sulfuric acid and evaporated down to dryness. This step in the process converts the iron, aluminum, titanium and zirconium into sulfates and the silica into silicic acid. However, on evaporating down to dryness the latter loses water and changes into the oxid.

The dried mass is now crushed fine and introduced into a dilute sulfuric acid solution (about 1 part of acid to 3 parts of water) through which live steam is preferably passed to heat and agitate the solution. This dissolves all but the silica which is removed by filtering.

The filtrate is placed in a suitable receptacle, diluted to about 1 part acid and 6 parts water, or more dilute, and sodium thio-sulfate is added in either a solid or dissolved form. This solution is similarly agitated and heated by passing live steam through it until the temperature is about 100° C.

During this latter step in the process the following reactions may be considered to have taken place:—

$$Zr(SO_4)_2 + 2Na_2S_2O_3 \cdot 5H_2O + H_2O =$$
$$ZrO_2 \cdot H_2O + 2SO_2 + 2Na_2SO_4 + 2S + 5H_2O.$$
$$Ti_2(SO_4)_3 + 2Na_2S_2O_3 \cdot 5H_2O + H_2O =$$
$$2TiO_2 \cdot H_2O + 3SO_2 + 2Na_2SO_4 + 2S + 4H_2O.$$

The iron and aluminum stay in solution after the thio-sulfate treatment and are separated from the zirconium and titanium by filtration. The precipitate is dried and calcined to about 500° or 600° C. for about 36 hours, to volatilize the adhering sulfur and to convert the hydrated oxid of zirconium ($ZrO_2H_2O$) to the oxid $ZrO_2$. The calcined oxid is then found to be practically free from all impurities, excepting titanium.

My invention is not limited to the use of the exact reagents specified, nor to all the details given in fully explaining the process. In the first step of the process another acid, such as hydrochloric acid, could be used, but it would not be so satisfactory. However, in the latter part of the process hydrochloric acid would be just as satisfactory as sulfuric acid, and therefore can equally as well be used. Also potassium thio-sulfate can be substituted for the sodium thio-sulfate. These equivalents are not specifically mentioned in the claims on account of the formal objection of alternativeness, but they are intended to cover the same nevertheless.

As previously stated, this process does not reduce the titanium content of the ore, but for some uses this is not objectionable. In fact, in the arc lamp electrode industry, where zirconium is used extensively, the titanium would be desirable as it in itself is a good flaming constituent of arc lamp electrodes. However, for some uses, such as in the glazed enameling industry, titanium is objectionable. I have devised another process for removing it from the zirconium oxid, and have filed a copending application thereon.

It will be clear that rutile can be freed of impurities such as the oxids of iron, aluminum and silicon, by this same process, and my invention is therefore applicable to such use.

Having described my invention, what I claim is:—

1. The process of purifying crude zirconium and titanium ores, which consists in treating the same with an excess of hot concentrated sulfuric acid and evaporating to substantial dryness, crushing the dried mass, dissolving out the soluble constituents with dilute sulfuric acid solution, treating said solution with sodium thio-sulfate while maintaining the temperature at substantially 100° C. to precipitate hydrated oxid of zirconium, and filtering and calcining the precipitate.

2. That step of the process of purifying zirconium-containing material, which consists in dissolving it in a weak sulfuric acid solution, adding sodium thio-sulfate to said solution while maintaining the temperature at substantially 100° C. to precipitate hydrated oxid of zirconium, filtering and calcining the precipitate to drive off the water of constitution and to volatilize adhering sulfur.

In testimony whereof, I hereunto affix my signature.

WILLIAM R. LOVEMAN.